April 4, 1950 W. K. WATERS 2,502,810
HARVESTING MACHINE FOR NUTS OR THE LIKE
Filed Jan. 29, 1948 10 Sheets-Sheet 5

INVENTOR.
Walter K. Waters
BY
Milburn & Milburn
Attorneys

April 4, 1950 W. K. WATERS 2,502,810
HARVESTING MACHINE FOR NUTS OR THE LIKE
Filed Jan. 29, 1948 10 Sheets-Sheet 6

INVENTOR.
Walter K. Waters

April 4, 1950 W. K. WATERS 2,502,810
HARVESTING MACHINE FOR NUTS OR THE LIKE
Filed Jan. 29, 1948 10 Sheets-Sheet 7

INVENTOR.
Walter K. Waters
BY
Milburn Milburn
Attorneys

April 4, 1950 W. K. WATERS 2,502,810
HARVESTING MACHINE FOR NUTS OR THE LIKE
Filed Jan. 29, 1948 10 Sheets-Sheet 8

INVENTOR.
Walter K. Waters
BY
Milburn Milburn
Attorneys

April 4, 1950 W. K. WATERS 2,502,810
HARVESTING MACHINE FOR NUTS OR THE LIKE
Filed Jan. 29, 1948 10 Sheets-Sheet 9

INVENTOR.
Walter K. Waters
BY
Milburn & Milburn
Attorneys

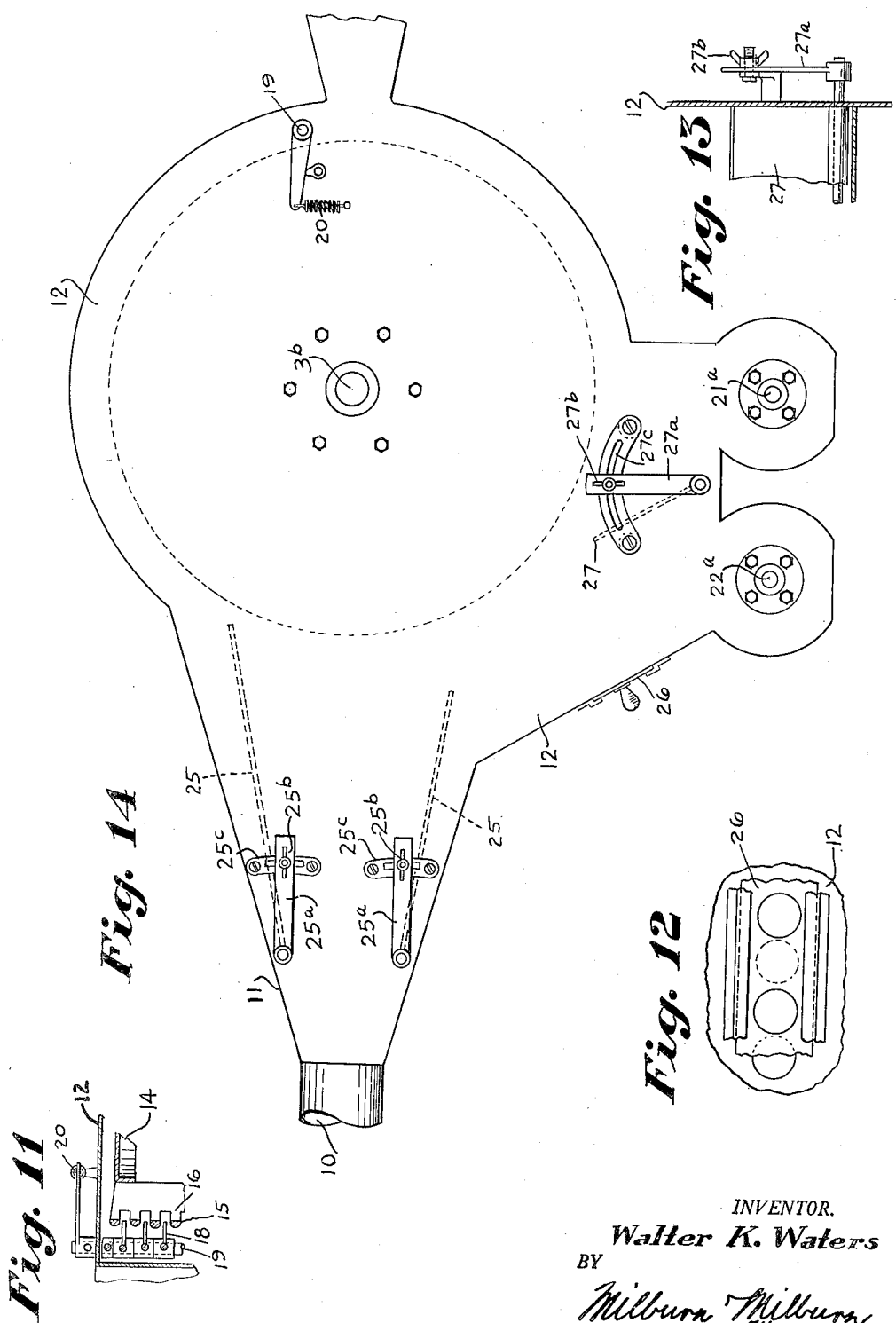

Patented Apr. 4, 1950

2,502,810

UNITED STATES PATENT OFFICE 2,502,810

HARVESTING MACHINE FOR NUTS OR THE LIKE

Walter K. Waters, Fair Oaks, Calif.

Application January 29, 1948, Serial No. 4,969

10 Claims. (Cl. 56—328)

This invention relates to the art of harvesting machines for nuts or the like, and more specifically consists in an improved device for gathering such a crop from the ground and separating the same from the heavier foreign matter which might be picked up therewith.

In harvesting almonds, for instance, many of them will have fallen to the ground and thus it is not practical if at all possible to gather the entire crop directly from the trees. Since the nuts which fall to the ground may be gathered in first-class condition and since, in fact, the fallen nuts may have the advantage of becoming dry upon the ground before gathering the same, my present invention contemplates the gathering of such a crop entirely from the ground. Thus, with my present system of gathering such a crop, the loss will be practically negligible; and, moreover, my present invention will permit the nuts to be harvested in excellent condition.

Preparatory to carrying out my present invention, the ground of the orchard will first be rolled a suitable length of time prior to the nuts falling or being shaken from the trees onto the ground. Then, with the nuts on the ground, my present machine will be run through the orchard in order to gather them from the ground. Unavoidably a quantity of leaves and loose soil and other foreign matter will be gathered with the nuts and my invention is intended to separate the nuts from the heavier parts of the foreign matter. The nuts will later be separated from the leaves etc. in a manner already well known to the industry.

Accordingly, it is the object of my present invention to devise an improved harvester for gathering a crop of nuts or the like and for separating the same from the heavier part of the foreign matter which may be picked up with the nuts or the like.

Another object is to provide such a device with means for gathering and separating the nuts or the like from the heavier foreign matter and in which the separating means may be operated without danger of clogging.

Another object is to devise such a machine with means for separating the nuts or the like from the heavier foreign matter and also with means for maintaining such separating means in clean and efficient condition.

Another object is to devise a harvesting machine with suction means for gathering the nuts or the like from the ground and with adjustable means for varying the effective path of the suction means in order to ensure most effective and dependable separation of the nuts from the heavier foreign matter.

A further object is to embody the above and other desirable features in a unitary and convenient form of machine structure which may be employed in an efficient manner in the gathering of a crop of nuts or the like from the ground.

Other objects will appear from the following description and claims when considered together with the accompanying drawings.

Fig. 11 is a view taken on line 11—11 of Fig. 10;

Fig. 12 is a view taken on line 12—12 of Fig. 10;

Fig. 13 is a view taken on line 13—13 of Fig. 10; and

Fig. 14 is a view taken on line 14—14 of Fig. 3.

Figure 1:
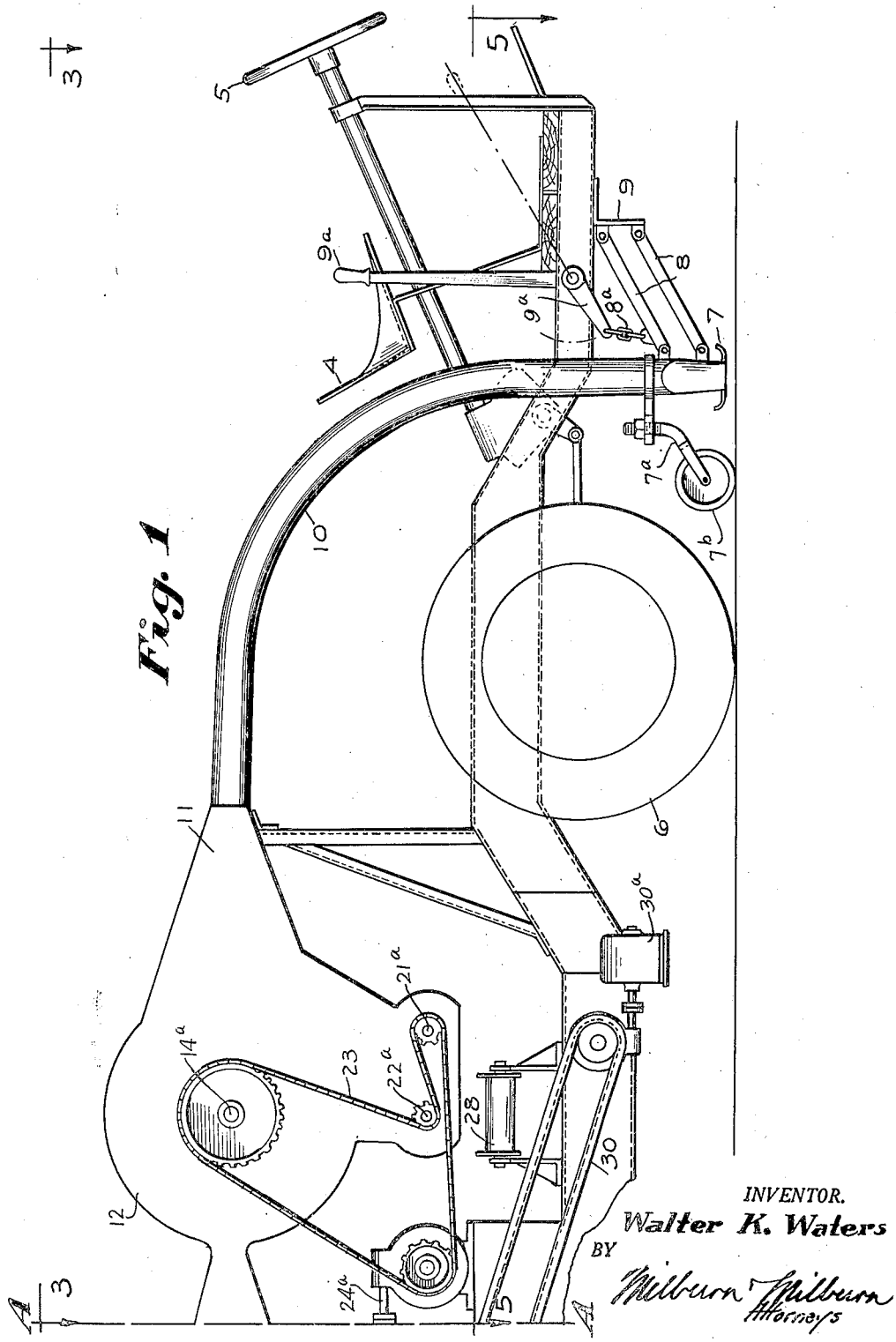
Fig. 1 is a side elevation of the front part of my present machine.

It is to be understood that the present form of disclosure is merely for the purpose of illustration and that there might be devised various modifications of the present invention without departing from the spirit of the same as herein set forth and claimed.

Referring now to the accompanying drawings in detail, the machine is shown embodied in an automotive conveyance with an electric motor 1 having a belt drive connection 1a to the transmission which has gear shift lever 2a for control of the drive connection to the rear wheels 2 of the conveyance. The electric generator 3 will supply the motor 1 and also the other electric motors for operation of the different parts of my present machine, as will appear from the following description. The generator 3 may be operated by a suitable form of engine 3a, as for instance a Diesel or internal combustion engine, through the belt connection 3c. All of the several motors may be controlled from a panel board at the front of the machine and easily accessible to the operator in the seat 4; and there will be provided the necessary wiring for the system of electric operation and control according to the manner herein contemplated. The steering wheel 5 for the front wheels 6 of the conveyance is also within easy reach of the operator when so seated at the point 4 indicated in the drawings.

At the front of the machine there is a transversely arranged series of nozzles 7 which are mounted upon the vertically adjustable arms 8 so as to hold the same in proper position both vertically and horizontally and to permit raising and lowering of the same as may be required from time to time during use of the machine. The arms 8 are pivotally mounted about a horizontal axis upon the draw bar 9 and are vertically adjustable as a single unit by means of the lever 9a which is readily accessible from the seat 4. The flexibility of the tubes 10, upon which the nozzles 7 are mounted, and the chain connections 8a between lever 9a and the arms 8, will permit self-accommodation of the nozzles 7 in the event of an obstruction upon the ground, and will also permit such adjustments of the nozzles 7 as above referred to and as may be necessary or desirable from time to time in the use of the machine. The combined effect of the nozzles 7 is to extend over the desired lateral span of ground to be covered at one time by the device for picking up the nuts or the like. In the region of each nozzle 7 there is attached to the corresponding tube 10, rearwardly thereof, a bracket 7a upon which is adjustably mounted the wheel 7b for the purpose of holding its nozzle 7, in each instance, at the proper and uniform elevation above the ground, as the machine advances thereover.

Figure 2:
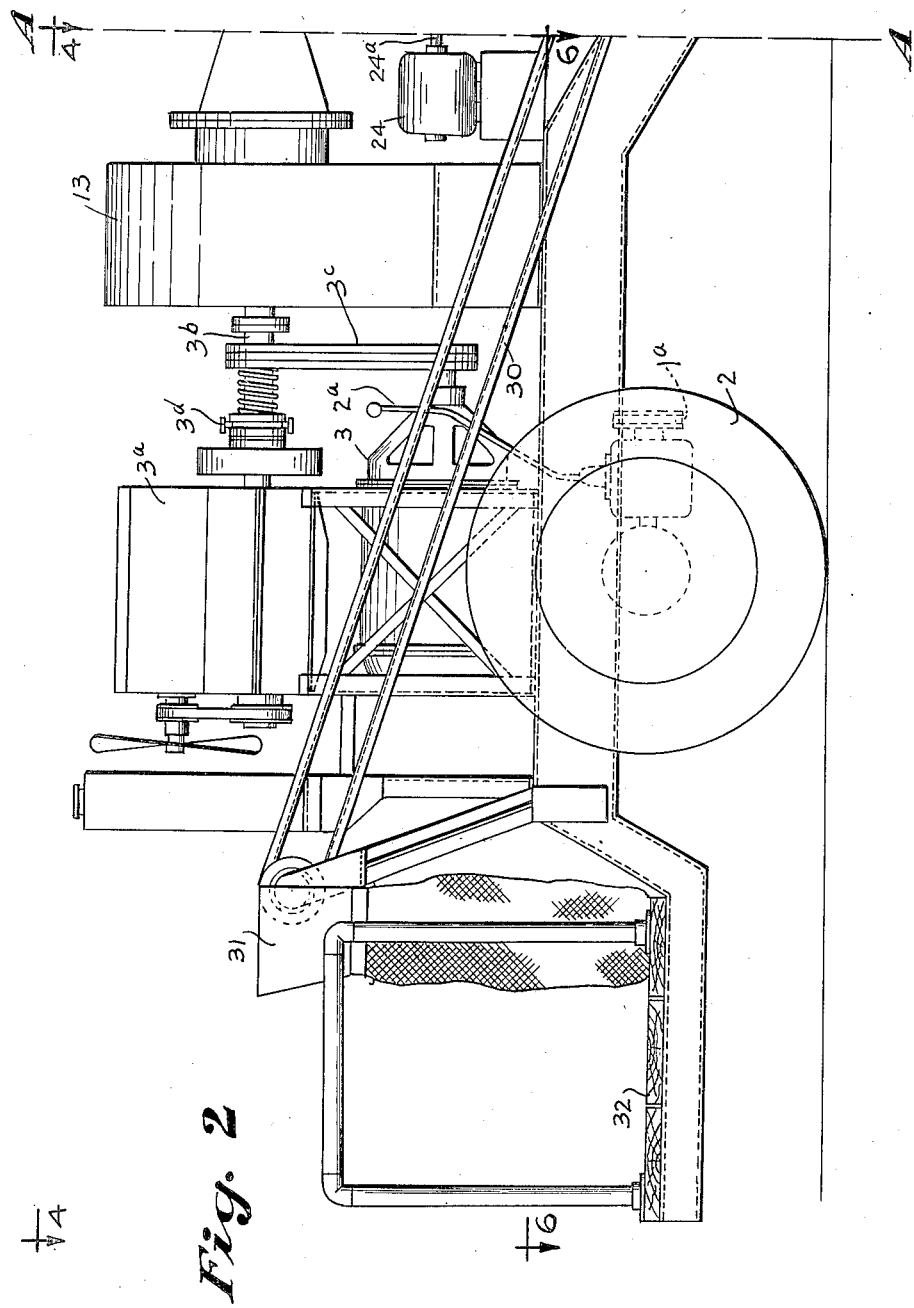
Fig. 2 is a side elevation of the rear part of my present machine, this view supplementing Fig. 1, as indicated by the lines A—A at the adjoining ends of these two views.
Figure 3:
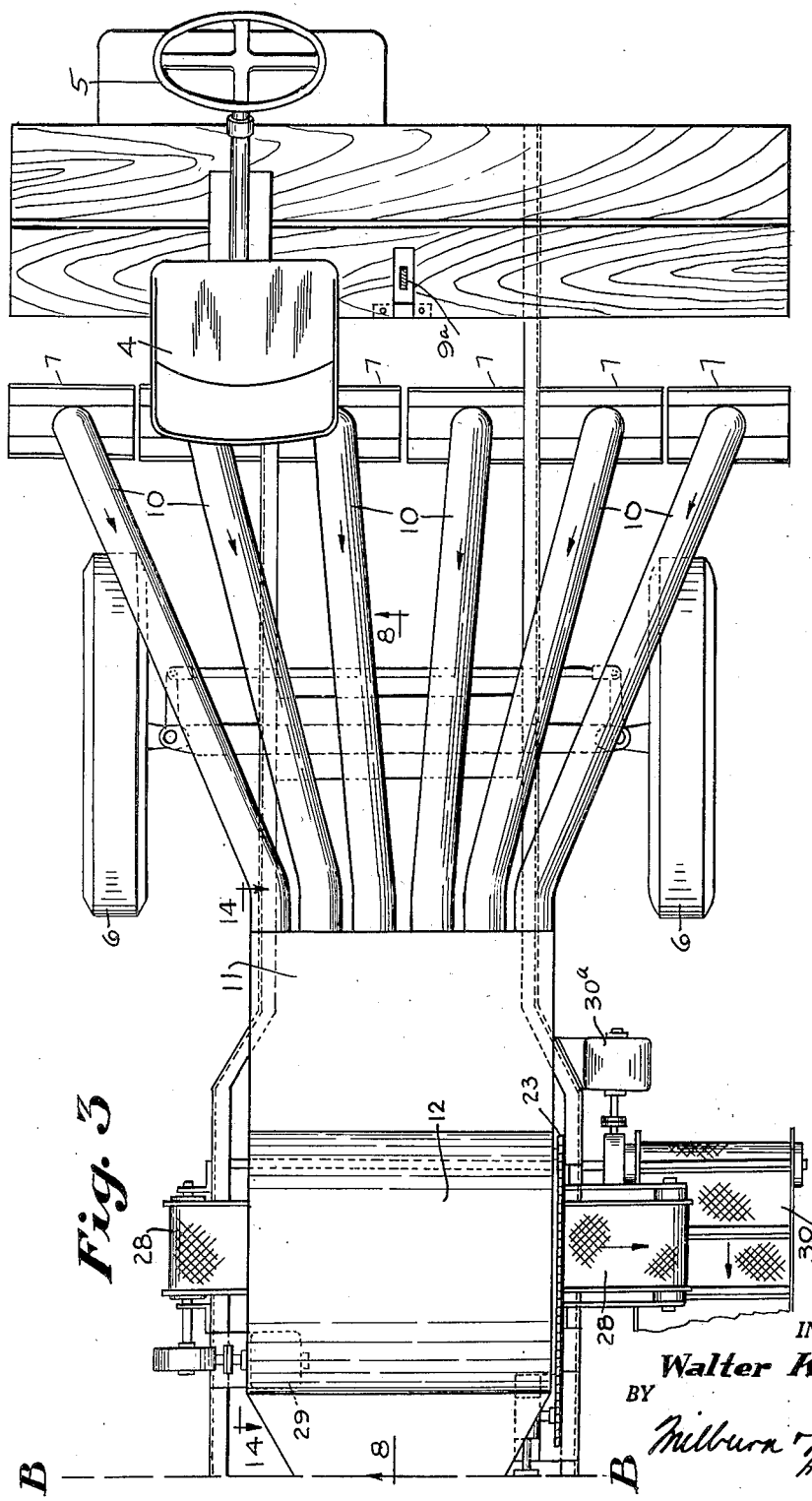
Fig. 3 is a top plan view of the front part of my present machine.
Figure 4:
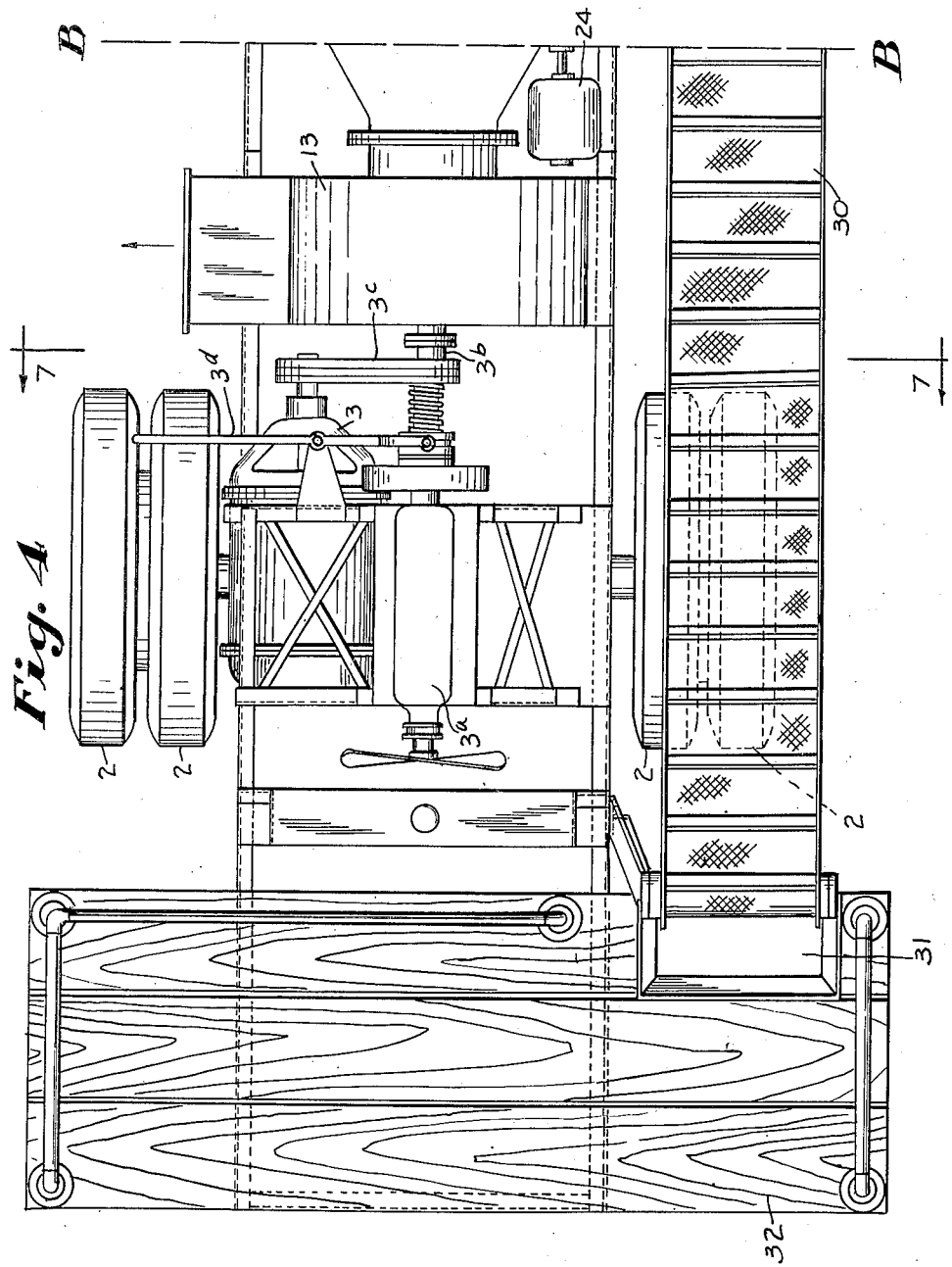
Fig. 4 is a top plan view of the rear part of my present machine, this view supplementing Fig. 3, as indicated by the lines B—B at the adjoining ends of these two views.
Figure 5:
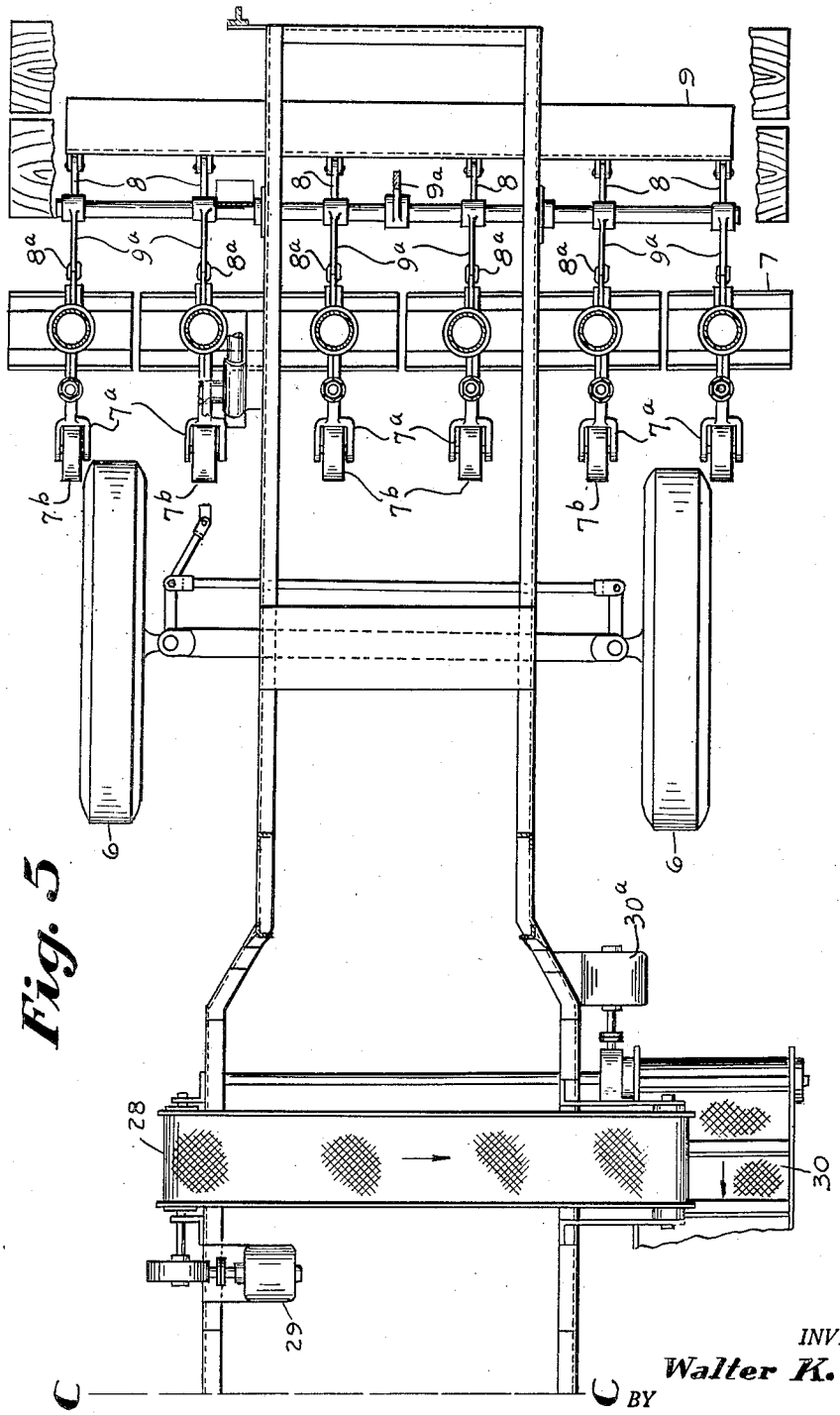
Fig. 5 is a view taken on line 5—5 of Fig. 1.
Figure 6:
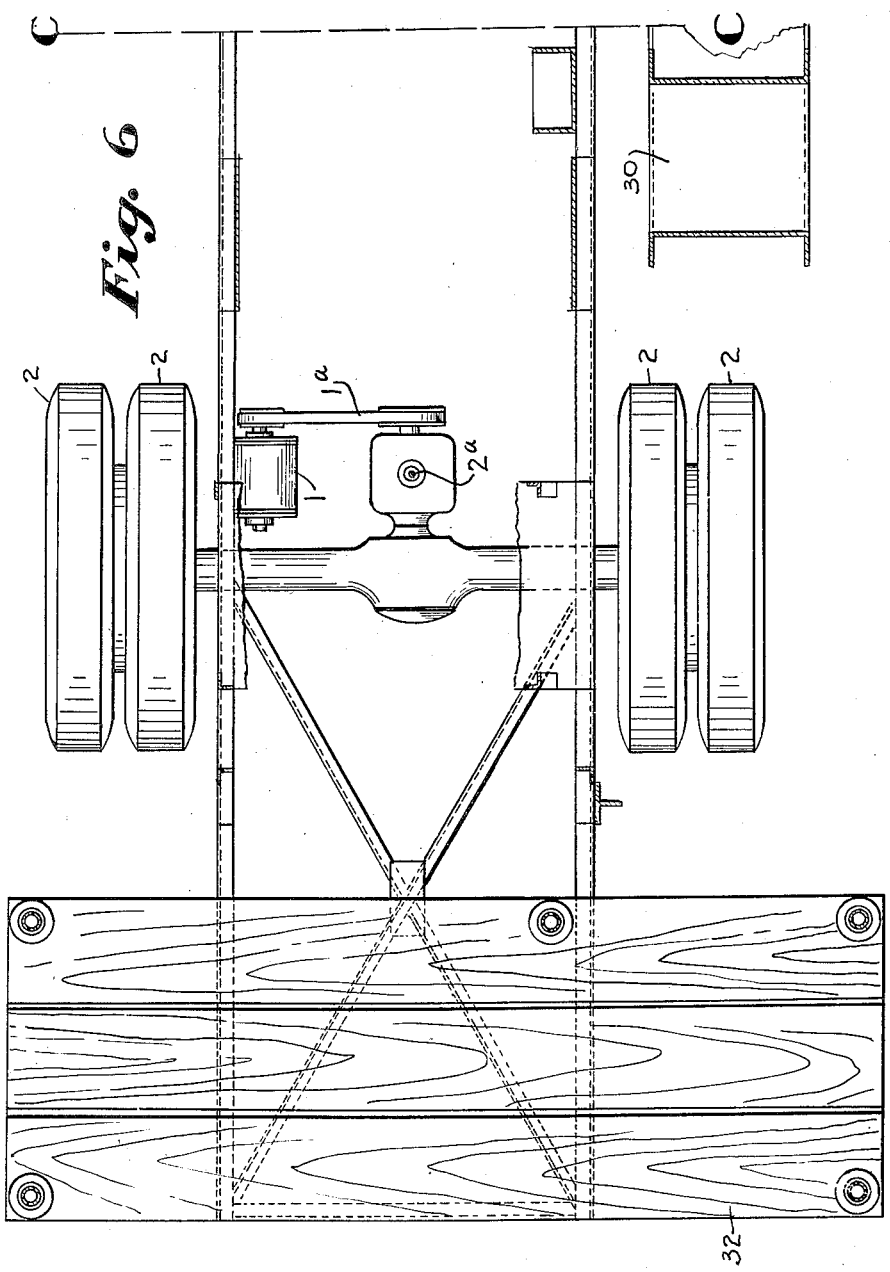
Fig. 6 is a view taken on line 6—6 of Fig. 2, this view supplementing Fig. 5, as indicated by lines C—C at the adjoining ends of these two views.
Figure 7:
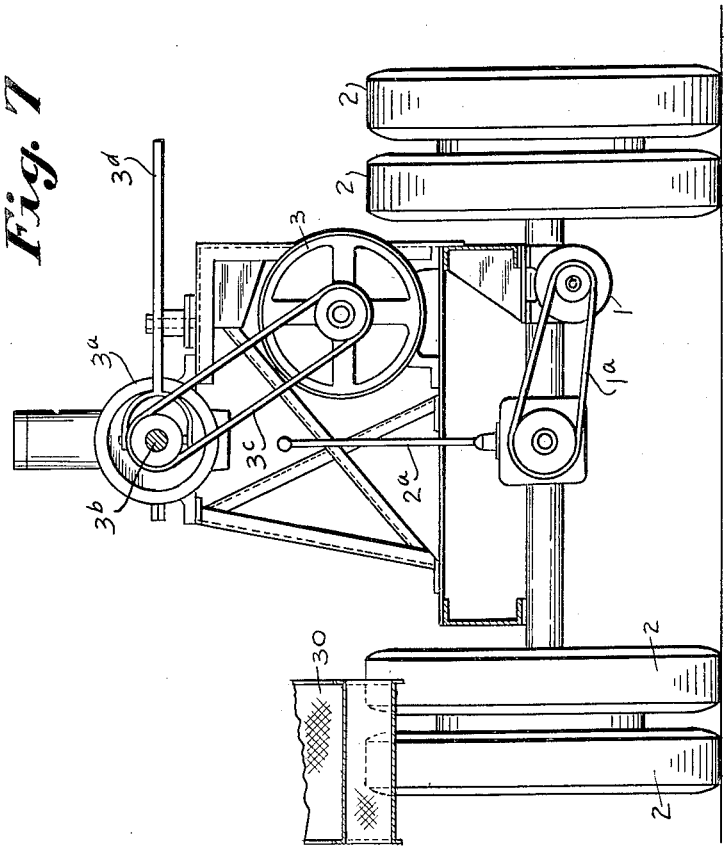
Fig. 7 is a view taken on line 7—7 of Fig. 4.

The tubes 10 lead rearwardly and are merged into one enlarged throat 11 which opens rearwardly into the housing 12 surrounding my improved means for separating the nuts and the heavier foreign material from each other, the force for conveying the nuts and the foreign material through the tubes 10 being supplied by an air pump 13. The air pump 13 is operated directly from shaft 3b of the engine 3a. Between the air pump 13 and the rear end of the enlarged throat 11 there is located the rotatable reticulate drum 14 which constitutes a principal part of my separating device. This drum 14 is operated by the electric motor 24 which has operative connection through shaft 24a and chain drive 23 to the drum shaft 14a. It might be added that there is provided a clutch, adapted for operation by the lever 3d, for throwing the air pump 13 into and out of operative connection with the engine 3a through its shaft 3b, as will appear from Figs. 2 and 4 of the drawings.

The outside of the drum 14 has a plurality of suitably spaced parallel rings 15 which are arranged concentrically about the longitudinal axis thereof. These rings 15 are mounted upon the spaced raised annular portions 16 about the drum 14, these portions in turn being supported by the skeleton frame members 17 arranged at suitable intervals about the drum and extending longitudinally thereof. Thus the drum 14 may be regarded as a reticulate body; and, with this arrangement, there is allowed sufficiently deep clearance between the rings 15 to permit the effective entrance of resilient or resiliently-acting fingers 18 for keeping these intermediate spaces clean. This entire gang of fingers 18 may be all mounted upon the bar 19 which may be resiliently mounted by means of the spring 20 upon the frame or housing 12 and in the vicinity of the drum 14 so as to occupy operative relation thereto.

The rings 15 are spaced in accordance with the size of the nut or the like for which the device is to be employed. That is to say, the spaces between adjacent rings 15 will in each instance be slightly less than the smallest dimension of the nut or the like so that the nuts will not become clogged within such spaces. By having the outer surfaces of the rings 15 of convex form, there is obtained more dependable deflection of the heavier foreign matter from the drum and also more dependable separation of the nuts or the like therefrom.

This operation, with its selective separation is made possible by the force of suction from the air pump 13 through the reticulate drum 14 and the drawing of the nuts or the like and the foreign matter thereby up through the tubes 10 and the impingement of the same against the outside of the drum 14 in such manner that the heavier foreign matter will be deflected from the near side of this drum while the nuts or the like and the lighter-weight foreign matter, such as leaves, will be carried by the force of suction with the drum to a farther point in its rotation, the nuts and such lighter foreign matter adhering to the outside of the drum 14, that is until there is reached the point of rotation of the drum where the force of suction is no longer effective. When the nuts and lighter foreign matter pass beyond the region of effectiveness of the force of suction, they too will drop from the surface of the drum 14, as will be more fully explained. I have provided means which can be adjusted for regulating this effective path or zone of suction and this means will be so adjusted that the nuts and lighter-weight foreign matter will be carried to the proper point to fall by gravity into the chute of the rotatable air-trap 22.

The air-traps 21 and 22, through their shafts 21a and 22a, respectively, are operated by the chain drive 23 from the electric motor 24 which drives also the rotatable deflector or separator drum 14, the purpose of these air-traps being to prevent any upward draft of air therethrough which might interfere with the passage of the material which is deposited in the same, as above explained. In each of the air-traps 21 and 22 the rotatable vanes are of such resilient nature that they may yield if necessary and thereby avoid sticking.

Figure 8:
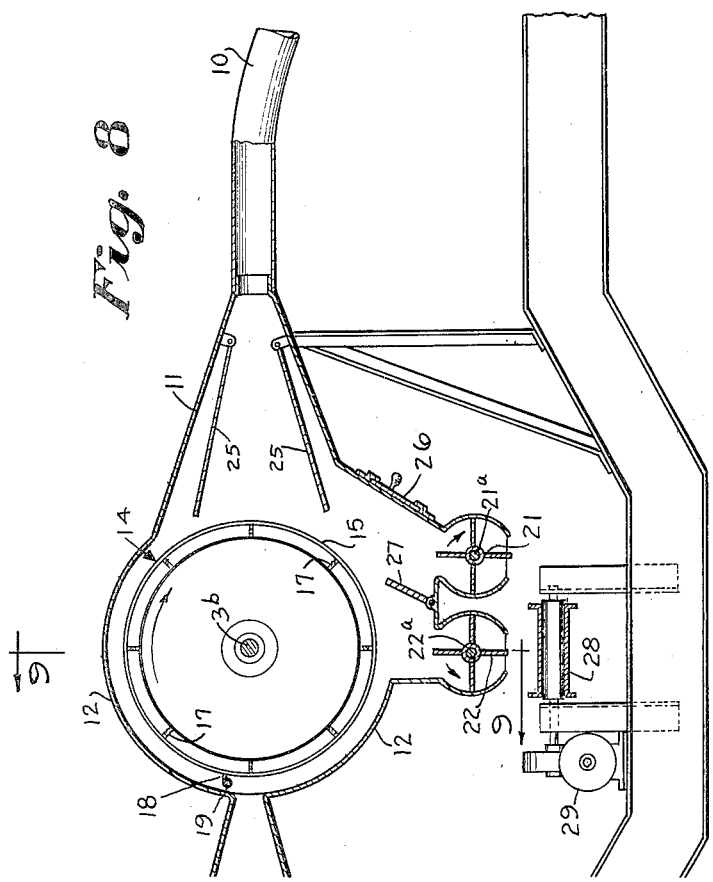
Fig. 8 is a view taken on line 8—8 of Fig. 3.
Figure 9:
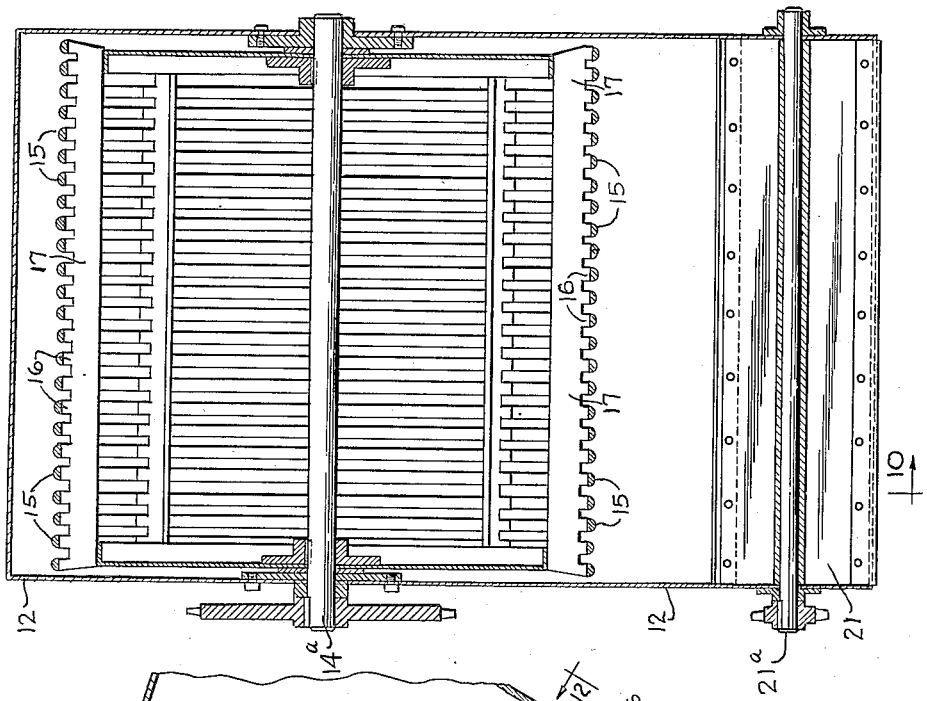
Fig. 9 is a view taken on line 9—9 of Fig. 8.
Figure 10:
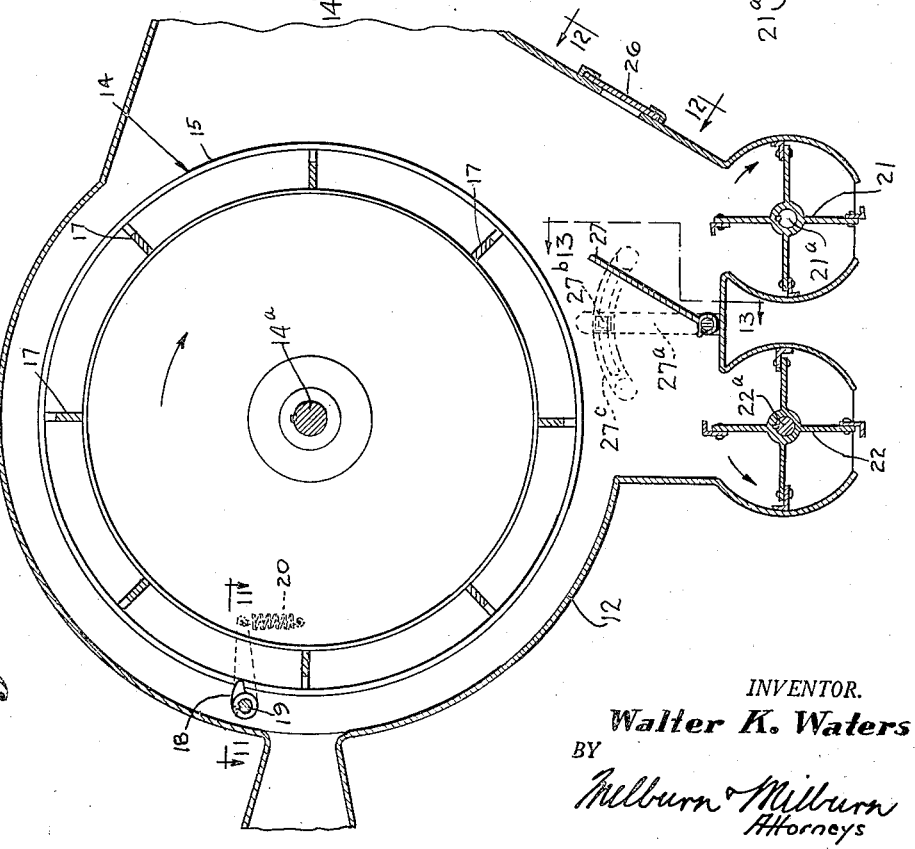
Fig. 10 is a view taken on line 10—10 of Fig. 9.

As a means of determining the extent of the path or zone of the suction through the drum 14, I have provided the two wings 25 which are pivotally mounted in front of the drum 14 and above and below the axis thereof, with readily accessible levers 25a for adjustment of the same individually about horizontal axes, as viewed in Fig. 8 for instance. Each of the lever arms 25a may be secured in adjusted position by means of the wing nut 25b or the like and bolt in connection with the slotted member 25c. With this arrangement, the width of the path of suction through the drum 14 may be varied at will, taking into consideration the deflection of the heavier foreign matter into its trap 21 and the nuts and leaves for instance into the other trap 22, as above explained. Consideration will be given also to the force of the suction and the weight of the material which is being handled by this device; as there must be established a proper balance between these factors in order to effect the deflection and deposit of the heavier foreign matter and the nuts and lighter-weight foreign matter at the two successive points, respectively, as above explained.

As a further provision for ensuring against the nuts falling away from the deflector drum 14 prior to their proper point of delivery into the trap 22, I have provided the shutter means 26 which is mounted within the wall of the housing 12 at a point between the lower wing 25 and the trap 21 and which is capable of slidable adjustment for providing more or less opening therethrough and thereby varying accordingly more or less the range of effectiveness of the suction through the drum 14. For instance, this shutter means may be opened when it is found necessary to widen still further the effective range of suction for holding the nuts onto the drum 14 to a point past the trap 21. The slidable shutter 26 may be apertured and may serve to open or close more or less other openings in the housing wall 12 and may be held in such adjusted position by frictional engagement in its guide-way or by any other suitable form of holding means.

The partition 27 is pivotally mounted between the traps 21 and 22 for adjustment about a horizontal axis for the purpose of still further ensuring proper segregation of the heavier material and the lighter material which includes the nuts or the like and the depositing of the same into their respective traps. The partition 27 may be set in adjusted position by means of the lever arm 27a which is mounted and readily accessible outside of the housing wall 12 and which has a bolt and wing nut means 27b for releasable engagement with the slotted member 27c.

The chutes in which the air-traps 21 and 22 are located, are at the bottom of the housing 12 which encloses the rotatable drum 14; and the heavier foreign matter which is deposited through the air-trap 21 will be permitted to fall to the ground. The nuts and lighter-weight foreign matter, which are deposited into the air-trap 22, will fall therefrom onto the transversely traveling endless conveyor belt 28 which extends about suitable rollers and is driven through suitable connection from an electric motor 29 to one of these rollers. The conveyor belt 28 will deposit the nuts and lighter-weight material by gravity onto the longitudinally extending conveyor belt 30 which will convey them rearwardly and upwardly to a hopper 31 at the rear end of the machine. The belt 30 extends about suitable rollers and is driven by the electric motor 30a which is operatively connected to one of these rollers. The hopper 31 is located at the rear platform 32 upon which the operator may stand for attaching an empty bag to the bottom of the hopper and for removing the same when filled.

In operation of this device, the engine 3a will first be started, with the clutch to the air pump 13 disconnected by lever 3d; and then the operator may start electric motor 1 from the panel board readily accessible from the operator's seat 4 and shift to the desired gear by means of the lever 2a. Thus the device may be conveyed to the desired point of use; and, until such point is reached, lever 9a may be held in proper position for raising the nozzles 7 and wheels 7b out of engagement with the ground and out of close, operative proximity to the ground and for holding the same in such elevated position. This same manipulation may be performed also at any time during actual use of the machine in the harvesting of the crop, whenever it might become necessary to pass over an obstacle upon the ground. Upon arriving at the point of use in the orchard, the nozzles 7 and wheels 7b may be lowered and the several electric motors may be set into operation by means of the controls at the panel board at the front of the machine, so as to thereby initiate operation of the rotatable deflector drum 14 and air-traps 21 and 22 and also the conveyor belts 28 and 30; and then the air pump 13 will be operatively connected to the engine 3a by proper manipulation of the hand lever 3d. It is understood, of course, that an empty bag has already been attached to the mouth of the hopper 31 so as to receive the nuts and lighter-weight material as they are gathered from the ground, in the manner above described, and drawn by the force of suction to the deflector drum 14 whence they are conveyed by the conveyor belts to the hopper 31. The bags of the nuts and the lighter-weight foreign matter may then be removed to the proper place for removal of the foreign matter from the nuts according to the regular practice above referred to.

Because of the comparatively slow rate of travel of this conveyance over the ground, the operator may conveniently give attention to all of the several manipulations and operations involved in the intended manner of use of this device, including those above mentioned.

Thus I have devised a machine which is capable of achieving all of the several above-mentioned objects in an efficient and expeditious manner, with the result that the entire crop of nuts may be harvested in such excellent condition that there may be precluded the necessity of later subjecting them to the usual drying process. This and other resultant advantages will suggest themselves to those who are familiar with the art to which the present invention relates.

What I claim is:

1. In a device of the class described, a rotatable reticulate drum of substantially cylindrical form having a plurality of axially spaced parallel annular raised members arranged thereabout and along the main part thereof, means for receiving and directing the nuts or the like from the ground to said drum, suction means effective through said receiving and directing means and transversely through said drum to a limited circumferential extent and of suitable degree for causing the nuts or the like and any foreign material to be impinged transversely against the outside of said drum and for permitting deflection and separation of only the heavier foreign material therefrom within the direct path of the suction and for permitting the nuts or the like to fall by gravity from said drum at a point beyond the direct path of the suction, separating means located beyond the direct path of suction for receiving the foreign material and the nuts, respectively, means extending between said annular members for cleaning the spaces therebetween, and means for operating said rotatable drum.

2. In a device of the class described, a rotatable reticulate substantially cylindrical drum having a plurality of axially spaced parallel annular raised members arranged thereabout and along the main part thereof, means for receiving and directing the nuts or the like from the ground to said drum, suction means effective through said receiving and directing means and transversely through said drum to a limited circumferential extent and of suitable degree for causing the nuts or the like and any foreign material to be impinged transversely against the outside of said drum and for permitting deflection and separation of only the heavier foreign material therefrom within the direct path of the suction and for permitting the nuts or the like to fall by gravity from said drum at a point beyond the direct path of the suction, separating means located beyond the direct path of suction for receiving the foreign material and the nuts, respectively, resiliently-acting fingers located at the rear side of said drum and extending between said annular members for cleaning the spaces therebetween, and means for operating said rotatable drum.

3. In a device of the class described, a rotatable substantially cylindrical reticulate drum having a plurality of axially spaced parallel annular raised members arranged thereabout and along the main part thereof, means for receiving and directing the nuts or the like from the ground to the said drum, suction means effective through said receiving and directing means and transversely through said drum to a limited circumferential extent and of suitable degree for causing the nuts or the like and any foreign material to be impinged transversely against the outside of said drum and for permitting deflection and separation of only the heavier foreign material therefrom within the direct path of the suction and for permitting the nuts or the like to fall by gravity from said drum at a point beyond the direct path of the suction, separating means located beyond the direct path of suction for receiving the foreign material and the nuts, respectively, adjustable means located in the region of the front side of said drum for varying circumferentially the effectiveness of the suction, and means for operating said rotatable drum.

4. In a device of the class described, a rotatable substantially cylindrical reticulate drum having a plurality of axially spaced parallel annular raised members arranged thereabout and along the main part thereof, means for receiving and directing the nuts or the like from the ground to said drum, suction means effective through said receiving and directing means and through said drum to a limited circumferential extent and of suitable degree for causing the nuts or the like and any foreign material to be impinged transversely against the outside of said drum and for permitting deflection and separation of only the heavier foreign material therefrom within the direct path of the suction, the spaces between said annular members being less than the size of an individual nut or the like being harvested, whereby the nuts or the like may fall by gravity from said drum at a point beyond the direct path of the suction, means for operating said rotatable drum, means for receiving the heavier foreign material and the nuts or the like, respectively, upon being deposited from said drum, and adjustable means for separating the paths of deposit thereof so as to ensure the segregation of the heavier foreign material from the nuts or the like, said separating means being located forward of the direct path of the force of suction.

5. In a device of the class described, a rotatable substantially cylindrical reticulate drum having a plurality of axially spaced parallel annular raised members arranged thereabout and along the main part thereof, means for receiving and directing the nuts or the like from the ground to said drum, suction means effective through said receiving and directing means and through said drum to a limited circumferential extent and of suitable degree for causing the nuts or the like and any foreign material to be impinged transversely against the outside of said drum and for permitting deflection and separation of only the heavier foreign material therefrom, adjustable means located in the region of the front of said drum for varying circumferentially the extent of the path of the suction therethrough, the spaces between said annular members being less than the size of an individual nut or the like being harvested, whereby the nuts or the like may fall by gravity from said drum at a point beyond the direct path of the suction, means for operating said rotatable drum, means for receiving the heavier foreign material and the nuts or the like, respectively, upon being deposited from said drum, and adjustable means for separating the paths of deposit thereof so as to ensure the segregation of the heavier foreign material from the nuts or the like, said separating means being located forward of the direct path of the force of suction.

6. In a device of the class described, a rotatable reticulate drum of substantially cylindrical form having a plurality of axially spaced parallel annular raised members about the exterior of said reticulate drum and along the main part thereof and being spaced from each other so as to provide uninterrupted annular spaces therebetween of a width less than the smallest dimension of the nuts or the like, means for receiving and directing the nuts or the like from the ground to said drum, suction means effective through said receiving and directing means and transversely through said drum to a limited circumferential extent and of suitable degree for causing the nuts or the like and any foreign material to be impinged transversely against the outside of said drum and for permitting deflection and separation of only the heavier foreign material therefrom within the direct path of the suction and for permitting the nuts or the like to fall by gravity from said drum at a point beyond the direct path of the suction, separating means located beyond the direct path of suction for receiving the foreign material and the nuts, respectively, and means for operating said rotatable drum.

7. In a device of the class described, a rotatable reticulate drum of substantially cylindrical form having a plurality of axially spaced parallel annular raised members with convex outer surfaces about the exterior of said reticulate drum and along the main part thereof and being spaced from each other so as to provide uninterrupted annular spaces therebetween of a width less than the smallest dimension of the nuts or the like, means for receiving and directing the nuts or the like from the ground to said drum, suction means effective through said receiving and directing means and transversely through said drum to a limited circumferential extent and of suitable degree for causing the nuts or the like and any foreign material to be impinged transversely against the outside of said drum and for permitting deflection and separation of only the heavier foreign material therefrom within the direct path of the suction and for permitting the nuts or the like to fall by gravity from said drum at a point beyond the direct path of the suction, separating means located beyond the direct path of suction for receiving the foreign material and the nuts, respectively, and means for operating said rotatable drum.

8. In a device of the class described, a rotatable reticulate drum of substantially cylindrical form having a plurality of axially spaced parallel annular raised members about the exterior of said reticulate drum and along the main part thereof and being spaced from each other so as to provide uninterrupted annular spaces therebetween of a width less than the smallest dimension of the nuts or the like, means for receiving and directing the nuts or the like from the ground to said drum, suction means effective through said receiving and directing means and transversely through said drum to a limited circumferential extent and of suitable degree for causing the nuts or the like and any foreign material to be impinged transversely against the outside of said drum and for permitting deflection and separation of only the heavier foreign material therefrom within the direct path of the suction and for permitting the nuts or the like to fall by gravity from said drum at a point beyond the direct path of the suction, separating means located beyond the direct path of suction for receiving the foreign material and the nuts, respectively, means for operating said rotatable drum, and means for receiving the heavier foreign material and the nuts or the like, respectively, upon being deposited from said drum, and adjustable means for separating the paths of deposit thereof so as to ensure the segregation of the heavier foreign material from the nuts or the like, said separating means being located forward of the direct path of the force of suction.

9. In a device of the class described, a rotatable substantially cylindrical reticulate drum having a plurality of axially spaced parallel raised rings arranged circumferentially thereabout and along the main part thereof, tubular means for conveying nuts or the like to the outside of said drum in a direction substantially transversely thereof, the spaces between said rings to the extent of their effectiveness being substantially continuous and uninterrupted throughout, suction means effective through said tubular means and through said drum to a limited circumferential extent and of suitable degree for causing the nuts or the like and any foreign material to be impinged against the outside of said drum and for permitting deflection and separation of only the heavier foreign material therefrom within the direct path of the suction and for permitting the nuts or the like to fall by gravity from said drum at a point beyond the direct path of the suction, means for operating said rotatable drum, and resiliently-acting fingers mounted for engagement within the spaces between said rings for preventing of clogging of the same.

10. In a device of the class described, a separator comprising a rotatable reticulate substantially cylindrical drum having a plurality of axially spaced parallel annular raised members arranged circumferentially thereabout and along the main part thereof, means for directing material to said drum, suction means effective through said directing means and transversely through said drum to a limited circumferential extent and of suitable degree for causing the material to be impinged transversely against the outside of said drum and for permitting the heavier material to be deflected and separated therefrom within the direct path of the suction and for permitting the lighterweight material to fall by gravity from said drum at a point beyond the direct path of the suction, means for operating said rotatable drum, and resiliently-acting means located rearwardly of said drum and extending into the spaces between said annular members for preventing clogging of the material therewithin.

WALTER K. WATERS.

REFERENCES CITED

The following references are of record in the file of this patent:

UNITED STATES PATENTS

| Number | Name | Date |
| --- | --- | --- |
| 1,185,110 | Le Baron | May 30, 1916 |
| 1,318,003 | Wheeler et al. | Oct. 7, 1919 |
| 1,784,702 | Morano | Dec. 9, 1930 |
| 2,131,672 | Rich | Sept. 27, 1938 |
| 2,134,216 | Sutter | Oct. 25, 1938 |
| 2,231,352 | Shoemaker | Feb. 11, 1941 |
| 2,429,743 | Bingham et al | Oct. 28, 1947 |